United States Patent [19]

Kamiwaki

[11] Patent Number: 5,626,218
[45] Date of Patent: May 6, 1997

[54] BELT UNLOADER PROVIDED WITH A SCREW FEEDER SYSTEM

[75] Inventor: Tadayoshi Kamiwaki, Ehime, Japan

[73] Assignee: Sumitomo Heavy Industries, Ltd., Tokyo, Japan

[21] Appl. No.: 470,714

[22] Filed: Jun. 6, 1995

[30]  Foreign Application Priority Data

Jun. 8, 1994 [JP] Japan .................................. 6-159072
Oct. 31, 1994 [JP] Japan .................................. 6-288661

[51] Int. Cl.$^6$ ................................................ B65G 65/16
[52] U.S. Cl. .......................... 198/518; 198/519; 198/671; 414/140.7; 414/140.9; 414/141.6
[58] Field of Search .................................. 198/518, 519, 198/671; 414/140.2, 140.4, 140.7, 140.9, 141.4, 141.6

[56]  References Cited

U.S. PATENT DOCUMENTS

| | | | |
|---|---|---|---|
| 4,603,774 | 8/1986 | Siwersson et al. | 198/671 X |
| 4,963,066 | 10/1990 | Boppart | 198/671 X |
| 5,078,261 | 1/1992 | Miller et al. | 198/671 X |

FOREIGN PATENT DOCUMENTS

| | | |
|---|---|---|
| 61-37628 | 2/1986 | Japan . |
| 62-201732 | 9/1987 | Japan . |
| 63-176222 | 7/1988 | Japan . |

Primary Examiner—D. Glenn Dayoan
Attorney, Agent, or Firm—Burns, Doane, Swecker & Mathis, LLP

[57]  ABSTRACT

In a belt unloader provided with a vertical carrier (53) for carrying bulk cargo vertically, a screw feeder system is supported by a supporting frame (14) connected to a body frame (18) such that the supporting frame is allowed to be tilted. The screw feeder system is provided with a screw propeller (2) rotated about the center of a shaft extending in the vertical direction for taking bulk cargo in, a loading orifice (23) opposite to the upper part of the screw propeller, and a releasing plate (13) disposed at the upper end of the screw propeller for releasing bulk cargo from the screw propeller toward the loading orifice. The bulk cargo taken in through the loading orifice is carried vertically with the bulk held between a descending belt (20) and an ascending belt (21).

6 Claims, 11 Drawing Sheets

BELT UNLOADER PROVIDED WITH A SCREW FEEDER SYSTEM

BACKGROUND OF THE INVENTION

The present invention relates to a belt unloader and, more particularly to a belt unloader used for unloading bulk cargo such as grain, alumina, coal, limestone, gypsum, coke and copper concentrate with a belt conveyor from a hold continuously.

A belt unloader of the type described generally comprises a traveling frame which travels on a quay, a swivel base mounted on the traveling frame, a boom one end of which is mounted on the swivel base such that it is allowed to be hoisted or lowered, and a vertical carrier mounted on the boom at another end thereof such that it is allowed to swing. The vertical carrier is provided with an apparatus for taking bulk in at the lower end. The bulk is carried with it held between two belts in at least the vertical carrier.

Japanese Patent Laid-open No. Sho 63-176222 discloses a belt unloader provided with an exemplified apparatus for taking bulk. In the belt unloader, bulk is scattered upward by a rotary member called a paddle feeder and carried with it held between two opposite flat belts. The above-described apparatus is applicable for bulk cargo such as grain the bulk specific gravity of which is low, which has high fluidity in bulk and varies little in grain diameter. However, the apparatus applies too large impulse force to bulk cargo such as limestone, iron ore and ballast the bulk specific gravity of which is high because bulk is scattered upward by high-speed rotation of the paddle feeder and therefore, the apparatus is unsuitable due to noise and/or abrasion.

Japanese Patent Laid-open No. Sho 61-37628 discloses a screw unloader provided with an another apparatus for taking bulk. The apparatus does not cause the problem like above because it is designed to scrape bulk by a vertical screw conveyor. However, the apparatus has a defect that a gap of approximately 100 mm or larger is formed between the lower end of the vertical screw conveyor and the bottom of a ship or bulk cargo because a bearing and an arm for supporting it are required at the lower part of the vertical screw conveyor. As a result, bulk of at least 100 mm high is left on the bottom. Further, the above-described apparatus has another defect that if the vertical screw conveyor is used with it tilted, more bulk is left on the bottom.

Japanese Patent Laid-open No. Sho 62-201732 discloses other belt unloader. However, as described in detail later referring to drawings, this belt unloader has a disadvantage that the problem of bulk left on the bottom remains unsolved and if bulk cargo with low fluidity is carried out, efficiency of carriage is reduced. Further, if a ship fluctuates due to waves when unloading bulk cargo from the ship, an apparatus for taking bulk in may collide against the bottom of the ship and the apparatus and/or the bottom of the ship may be damaged. A wrong operation may also cause similar damage.

SUMMARY OF THE INVENTION

It is therefore an object of the present invention to provide a belt unloader applicable to a bulk cargo of various types independent of magnitude of bulk specific gravity.

It is another object of the present invention to provide a belt unloader of the type described which is allowed to leave little bulk on the bottom.

Yet another object of the present invention is to provide a belt unloader which is allowed to lift its screw feeder system at once when the bottom of a ship is lifted.

Other objects of this invention will become clear as the description proceeds.

According to this invention, there is provided a belt unloader for carrying bulk cargo comprising a boom which is allowed to be hoisted or lowered, and a vertical carrier connected to the boom such that it is allowed to swing. In the belt unloader, the vertical carrier comprises a body frame suspended from the boom, a supporting frame connected to the body frame such that it can be tilted, a screw feeder system supported by the supporting frame, and a conveyor belt. The screw feeder system comprises a screw propeller rotated about the center of a shaft in the vertical direction for taking bulk in, a loading orifice opposite to the upper face of the screw propeller, and a plate for releasing bulk from the screw propeller toward the loading orifice which is disposed at the upper face of the screw propeller. The conveyor belt is for vertically carrying bulk that is in the loading orifice.

DESCRIPTION OF THE PREFERRED EMBODIMENTS

Figure 1:
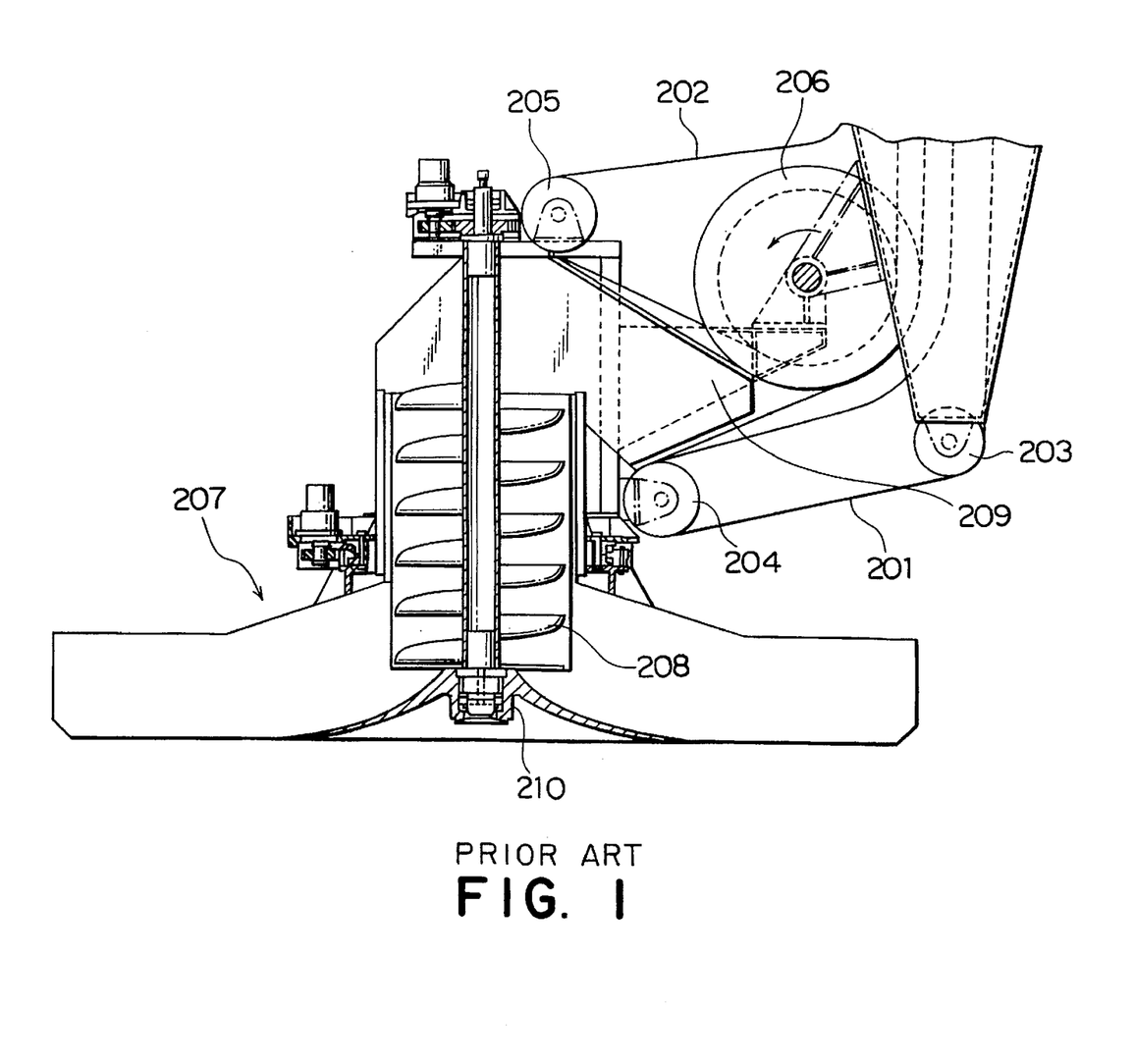
FIG. 1 is a partially cutaway side view showing a screw feeder system of a conventional belt unloader.

Referring to FIG. 1, a conventional belt unloader will be described first for better understanding of the invention. The conventional belt unloader is disclosed in Japanese Patent Laid-open No. Sho 62-201732 described in the background of the invention. In this belt unloader, two belts 201 and 202 are carried on belt pulleys 203, 204 and 205 and further on a common belt pulley 206. Two belts 201 and 202 define a sideways opening therebetween.

A screw feeder system is mounted to the belt unloader at the end thereof. The screw feeder system comprises a paddle feeder 207 for scraping bulk and a screw feeder 208 for feeding the bulk vertically upward. The paddle feeder 207 and the screw feeder 208 are coaxially mounted and scrape bulk to carry it upward in cooperation. A chute 209 is provided between the upper face of the screw feeder 208 and the opening between two belts 201 and 202. The chute 209 is provided for crossfeeding bulk into the opening between the two belts 201 and 202.

Further, the screw feeder 208 and the paddle feeder 207 are supported to a vertical carrier (not shown) so that they can be tilted relative to the vertical carrier. As a result, even if the vertical carrier is tilted, the paddle feeder 207 and the screw feeder 208 can be always kept vertical with being driven by a drive unit (not shown).

However, a relatively large gap is formed between the lower end of the screw feeder 208 and the bottom of a ship or bulk cargo because a bearing 210 is provided at the lower end of the screw feeder 208 and as a result, more bulk is left on the bottom. If bulk cargo has low fluidity, the efficiency of carriage is reduced because bulk is easily piled on the upper face of the screw feeder 208. If a ship fluctuates due to waves when bulk cargo is unloaded from the ship, the screw feeder system may collide against the bottom of the ship and the screw feeder system and/or the bottom of the ship may be damaged. A wrong operation may cause similar damage.

Figure 2:
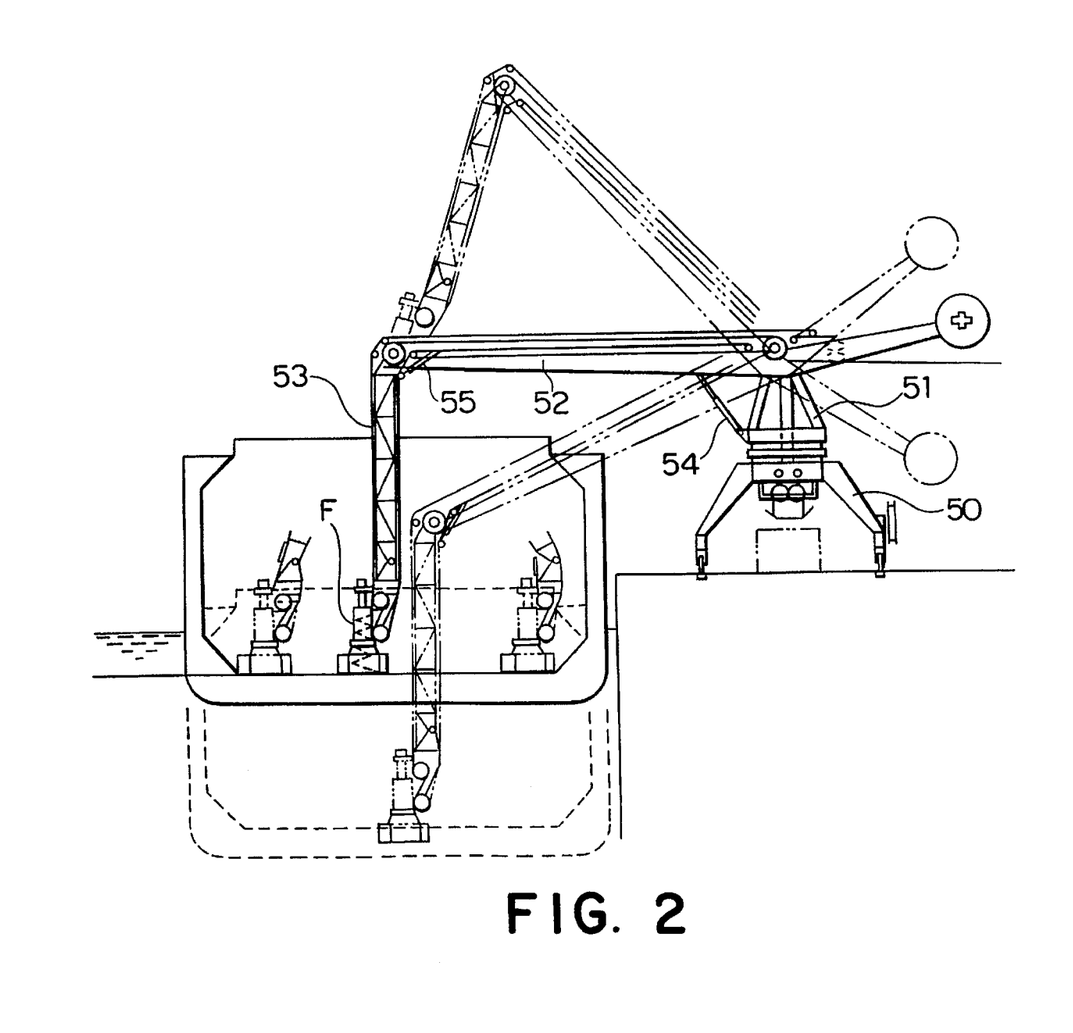
FIG. 2 is a schematic view for use in describing a belt unloader according to a first embodiment of the present invention.
Figure 3:
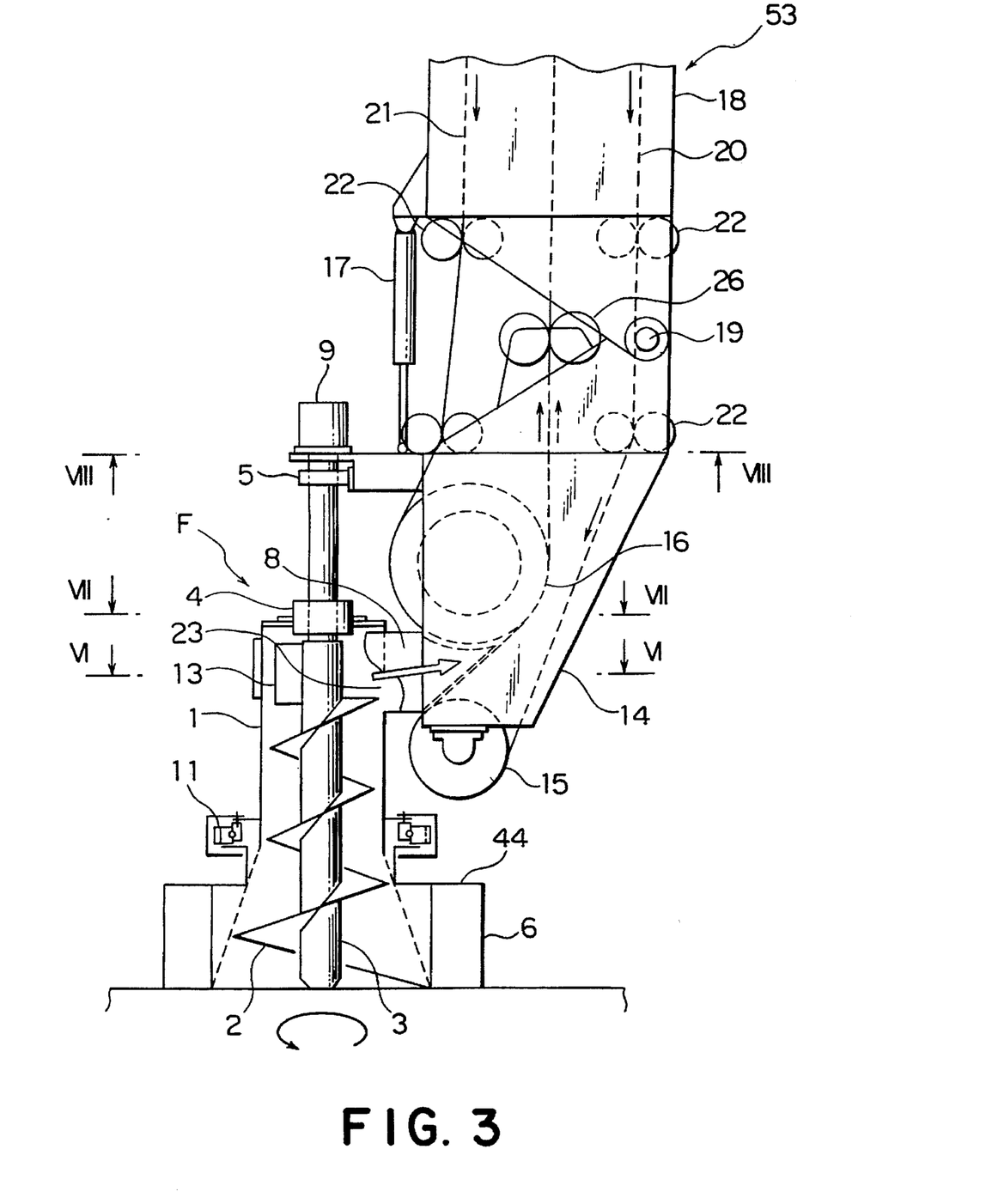
FIG. 3 is a partially sectional side view showing essentials of the belt unloader shown in FIG. 2.
Figure 4:
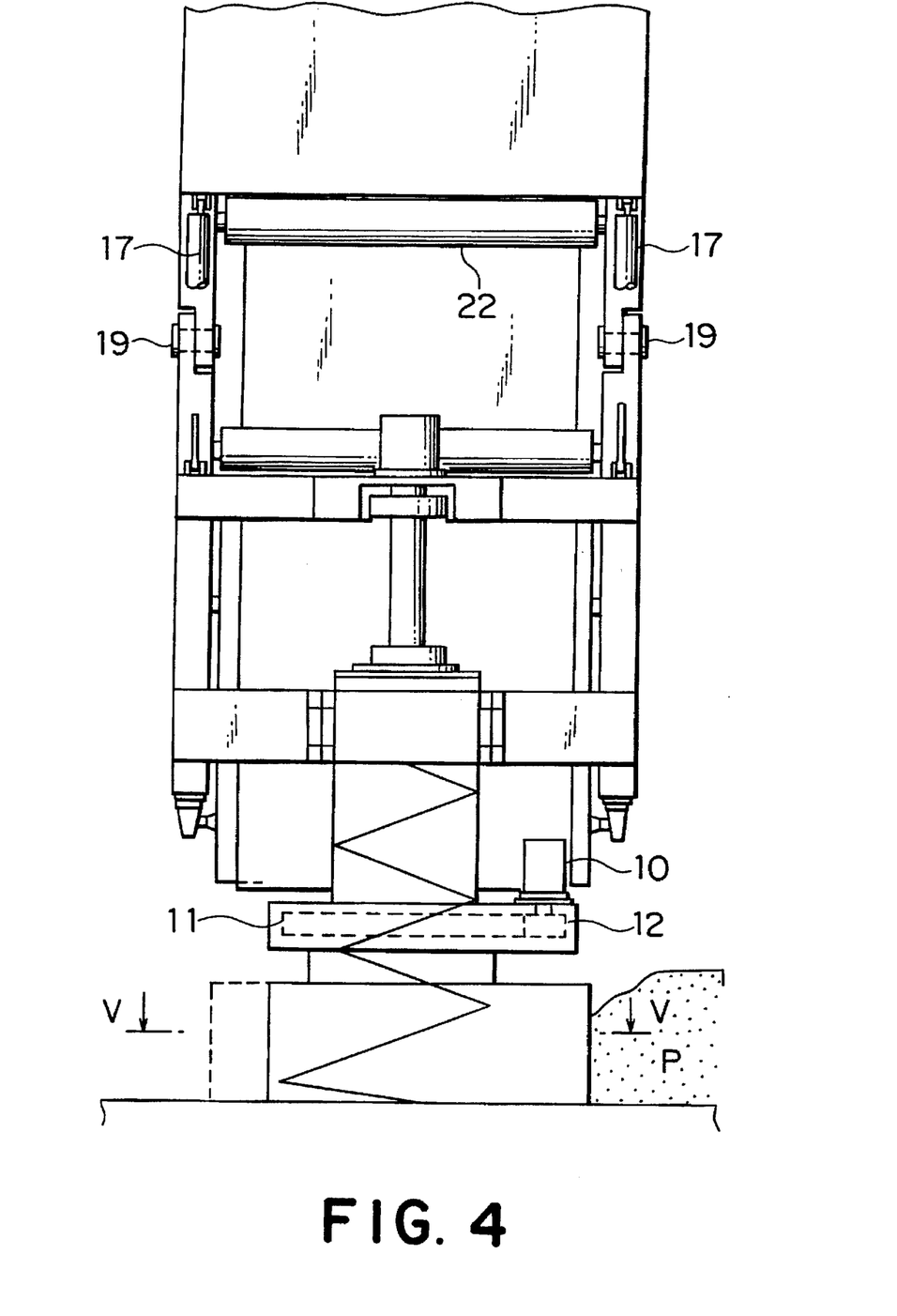
FIG. 4 is a front view showing the essentials of the belt unloader shown in FIG. 2.
Figure 5:
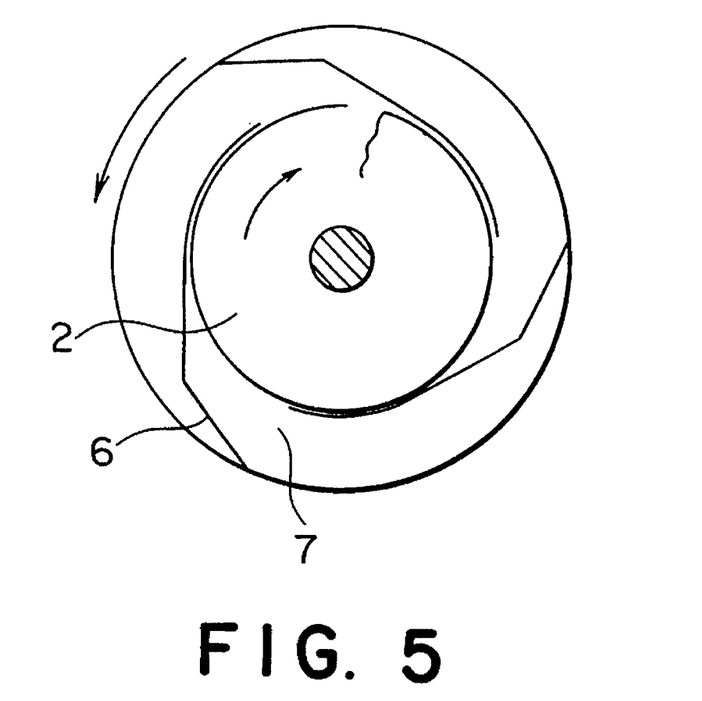
FIG. 5 is a sectional view of the essentials of the belt unloader taken along the line V—V in FIG. 4.
Figure 6:
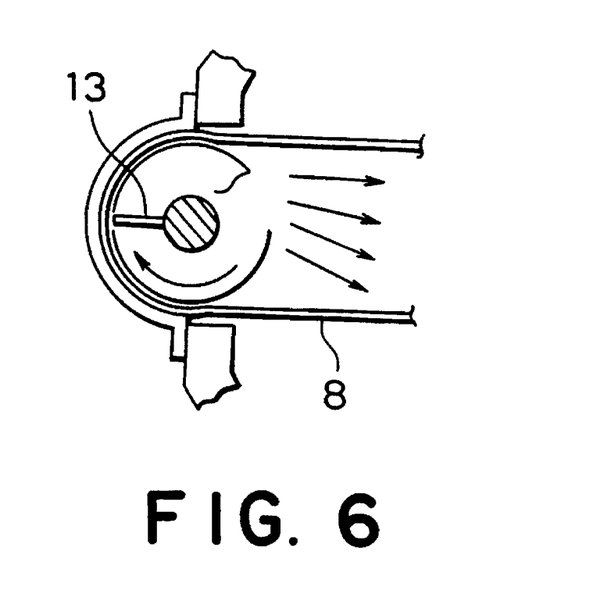
FIG. 6 is a sectional view taken along the line VI—VI in FIG. 3.
Figure 7:
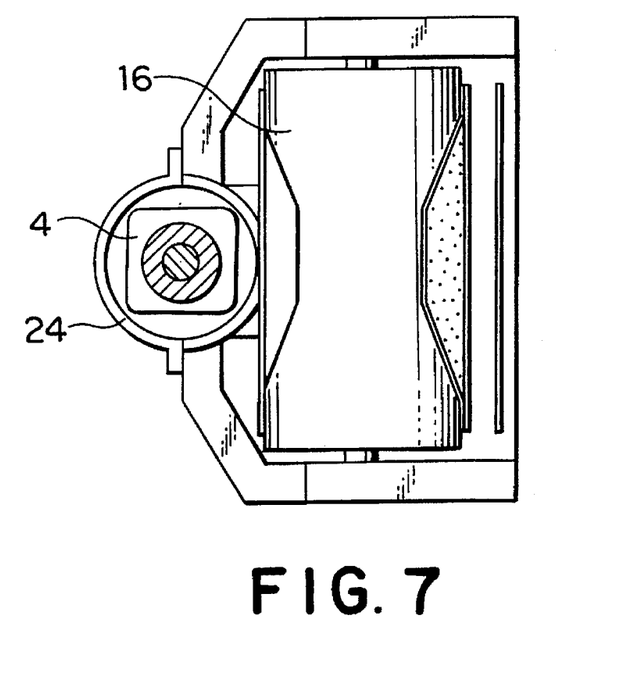
FIG. 7 is a sectional view taken along the line VII—VII in FIG. 3.
Figure 8:
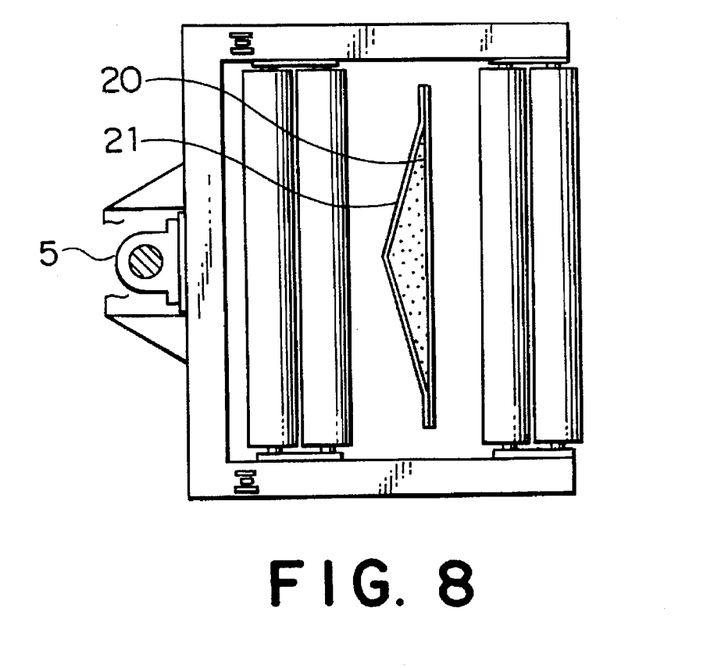
FIG. 8 is a sectional view taken along the line VIII—VIII in FIG. 3.

Turning to FIG. 2, a belt unloader according to a first embodiment of the invention will be described. The belt unloader comprises a traveling frame 50, a swivel base 51, a boom 52 and a vertical carrier 53. The traveling frame 50 is provided for traveling on a rail disposed on a quay. The swivel base 51 is provided for swiveling the boom 52 on the travelling frame 50. The boom 52 is hoisted or lowered on the swivel base 51 by a boom hoisting cylinder 54 which serves as a boom drive unit. The vertical carrier 53 is mounted on the boom 52 at the end thereof and swings by a swing cylinder 55. The screw feeder system F at the lower end of the vertical carrier 53 can be moved in front and behind, and right and left in a hold of a ship by combining each operation of swiveling, hoisting and swinging described above in order to scrape and carry bulk. Bulk scraped by the screw feeder system F is fed to the rear end of the boom 52 with the bulk held between two belts disposed so that they may be circulated in the vertical carrier 53 and the boom 52 and is supplied by the chute from there to a conveyor which serves as facilities on land. However, bulk may be carried with it held between two belts in the vertical carrier 53 and in the boom 52, it may be carried on a common belt conveyor.

Referring to FIGS. 3 to 8, the screw feeder system F will be described. A reference numeral 1 designates an external cylinder serving as the body of the screw feeder system F. A part of a bulk releasing guide 8 is connected or joined to the upper part of the external cylinder 1 with a bulk loading orifice 23 for the conveyor belt open. A bearing 4 provided at the upper end of the external cylinder 1 bears the upper part of a screw shaft 3. A releasing plate 13 is fixed by a bolt in contact with the upper end of a screw propeller 2 fixed on the screw shaft 3. Therefore, the releasing plate 13 can be replaced when it is worn or damaged.

An excavating drum 44 provided with an excavating blade 6 is supported on the lower part of the external cylinder 1 via a turntable bearing 11 and the excavating blade 6 is turned in the reverse direction to the rotational direction of the screw shaft 3 by an oil hydraulic motor 10 for driving the excavating drum and a pinion 12 in order to take bulk in from a bulk taking orifice 7 toward the screw propeller 2. The excavating blade 6 is open at the lower end and therefore, can excavate bulk under the excavating blade 6. An oil hydraulic motor 9 for driving the screw shaft is connected or joined to the screw shaft 3 via a shaft coupling.

The vertical carrier 53 comprises a body frame 18 supported by the boom 52 so that it can swing, and a supporting frame 14 supported at the lower end of the body frame 18 so that it can swing. The above-described screw feeder system F is bolted on the supporting frame 14 via the upper bearing 5 mounted on the screw shaft 3 and the upper part of the external cylinder 1 is also bolted on the supporting frame 14 via a fixing band 24.

The supporting frame 14 is pivotally mounted to the body frame 18 by pins 19, 19 and the swing cylinders 17, 17 so that it can swing. However, the supporting frame 14 and the body frame 18 are produced in a well-known construction such as box frame and trass construction.

The belt unloader further comprises an ascending belt 21 and a descending belt 20. The ascending belt 21 is carried on an hourglass-shaped tail pulley 16 disposed in the supporting frame 14 through belt supporting rollers 22. The descending belt 20 is carried on a tail pulley 15 disposed in the supporting frame 14 through the belt supporting rollers 22. A reference numeral 26 designates a belt supporting roller.

Next, bulk cargo unloading operation using the above-described belt unloader will be described. To unload bulk cargo, the excavating blade 6 is turned by driving the oil hydraulic motor 10 for driving the excavating drum. When the excavating blade 6 is turned, bulk P is taken in from the bulk taking orifice 7 toward a supply port of the screw propeller 2. When the bulk P is ascended by the screw propeller 2 reversely rotated to the excavating drum 44 by driving the oil hydraulic motor 9 for driving the screw shaft in the external cylinder 1 and reaches the top of the external cylinder, the bulk P is fed to the bulk loading orifice 23 of the belt conveyor by the releasing plate 13 through the releasing guide 8 and then, is carried to a bulk unloading hopper 25 by a well-known belt conveying means.

In unloading operation, the boom 52 is required to swing depending upon the volume of cargo. When the axis of the screw feeder system F is tilted following the swing of the boom 52, operation for taking bulk into the screw feeder system F is prevented. In such a case, the screw feeder system F can be adjusted so that the axis of the screw feeder system F may stand vertical by extending or with drawing the oil hydraulic cylinders 17 and the lower face of the excavating drum 44 of the screw feeder system F may be parallel with the bottom of a ship.

Figure 9:
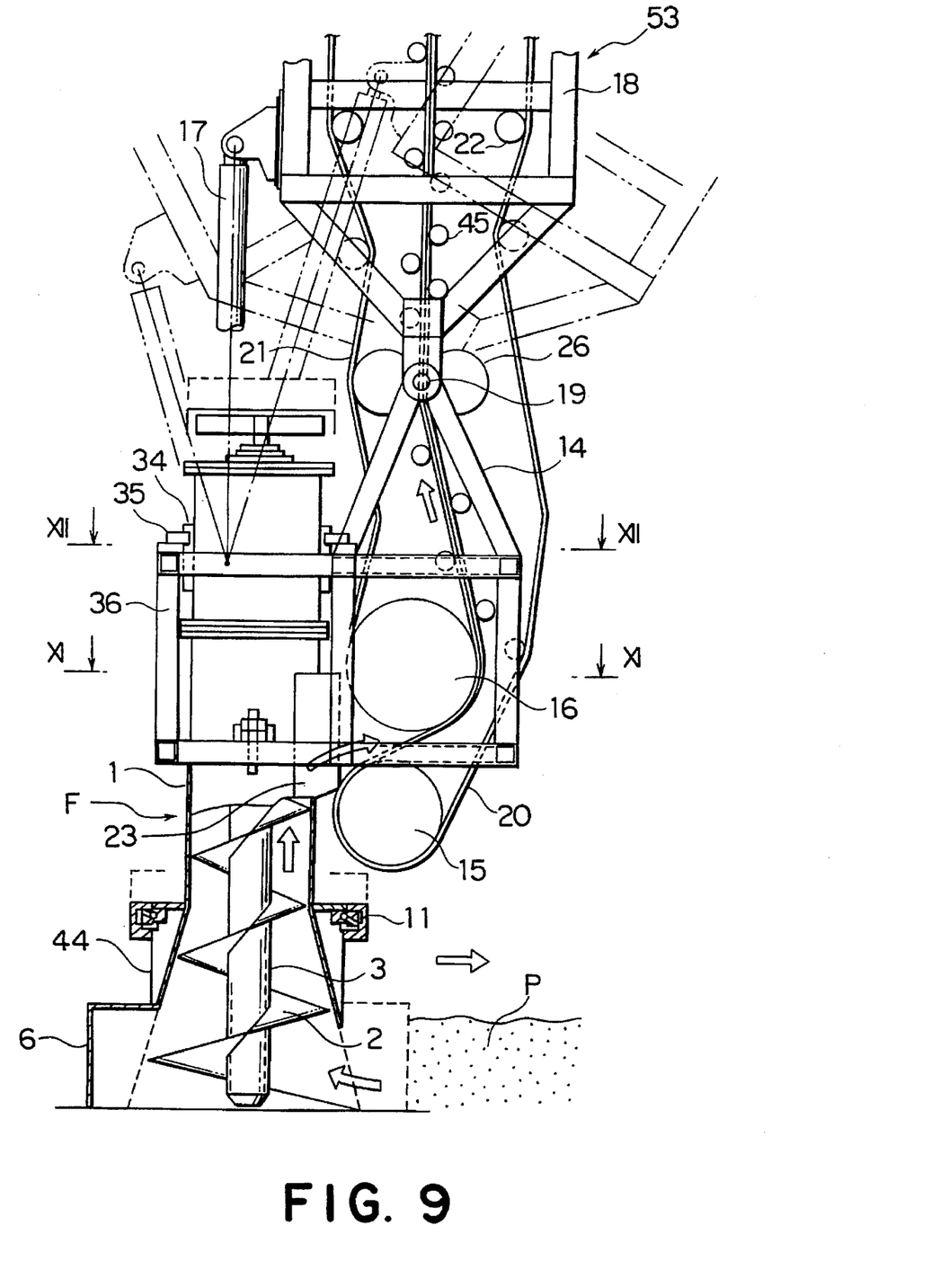
FIG. 9 is a partially cutaway side view showing essentials of a belt unloader according to a second embodiment of the present invention.

Next, referring to FIG. 9, a belt unloader according to a second embodiment of the present invention will be described. The same reference numeral is assigned to a similar part. The belt unloader is provided with a ship bottom follow-up system for absorbing shock when the screw feeder system F collides the bottom of a ship.

A bulk loading orifice 23 is provided at the upper part of an external cylinder 1 toward a bulk releasing guide 8 on the side of a conveyor belt. A screw shaft 3 is carried by a bearing 5 mounted on the upper part of the external cylinder 1. A motor 9 for driving the screw shaft is bolted to a bracket 25 projected from the upper periphery of the external cylinder 1. The shaft of the motor 9 for driving the screw shaft and the screw shaft 3 are joined via pulleys 27 and 46 and V belt 28. The space between the pulleys 27 and 46 can be adjusted by varying the position of a nut engaged with a bolt.

A releasing plate 13 for releasing bulk P toward the bulk releasing guide 8 on the side of the conveyor belt is fixed at the upper end of a screw propeller 2 of the screw shaft 3. An excavating drum 44 is supported on the lower part of the external cylinder 1 via a turntable bearing 11. When the excavating drum 44 is turned in the reverse direction to the rotational direction of the screw shaft 3 by an oil hydraulic motor 10 for driving the excavating drum and a pinion 12, an excavating blade 6 takes the bulk P in toward the screw propeller 2 through a bulk taking orifice 7. The above-described screw feeder system F is supported by a protruded frame 36 of a supporting frame 14 via the ship bottom follow-up system.

Figure 10:
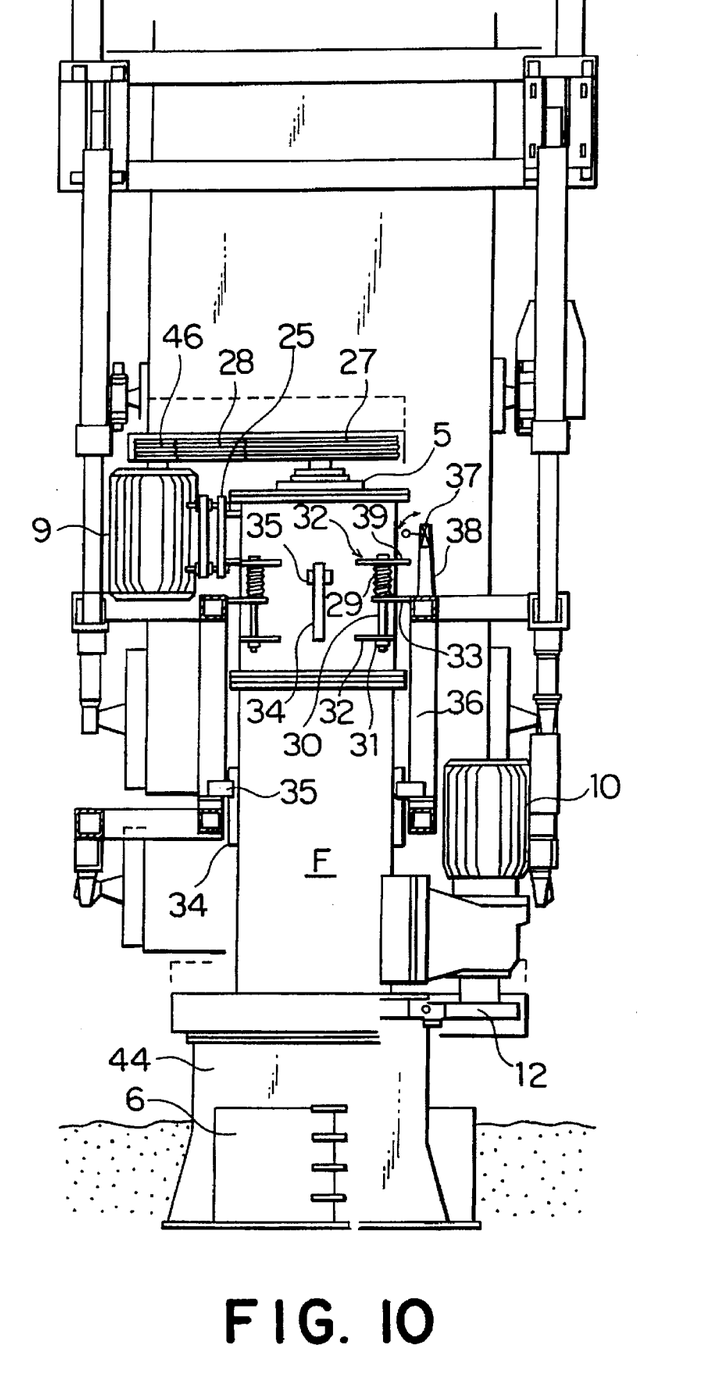
FIG. 10 is a front view showing the essentials of the belt unloader shown in FIG. 9.
Figure 11:
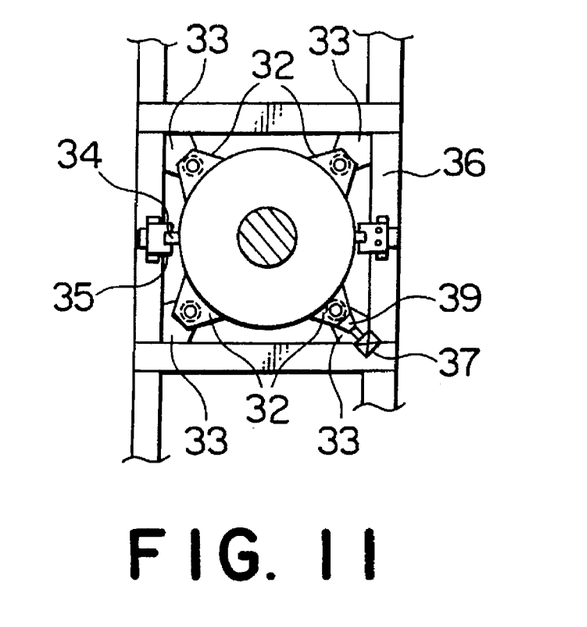
FIG. 11 is a sectional view showing the essentials taken along the line XI—XI in FIG. 9.
Figure 12:
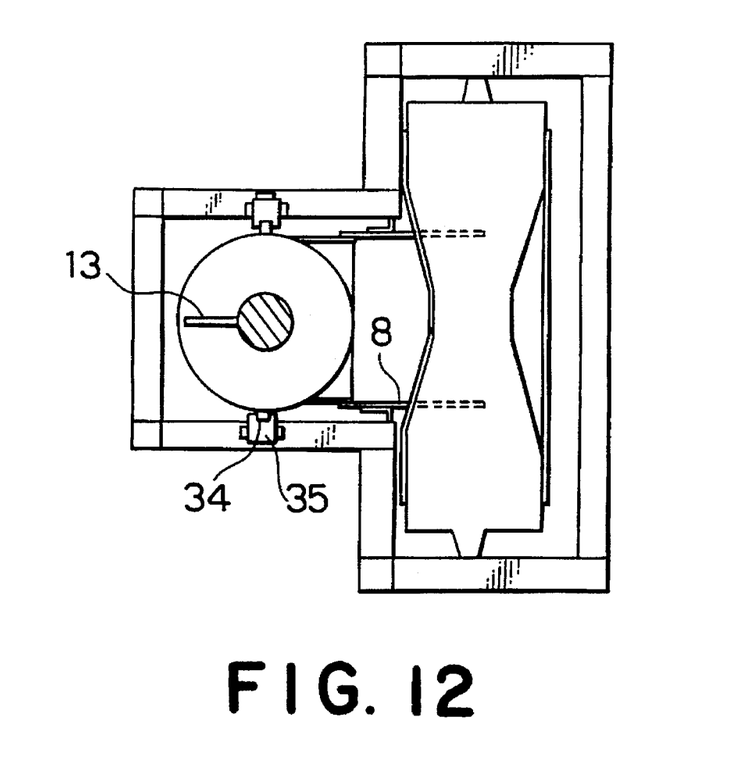
FIG. 12 is a sectional view showing the essentials taken along the line XII—XII in FIG. 9.

Next, referring to FIGS. 10 to 12, the ship bottom follow-up system will be described. Brackets 33 on the side of the protruded frame are provided at four corners of the protruded frame 36. In the meantime, brackets 32 on the side of the external cylinder 1 are also provided at four positions on the upper periphery of the external cylinder 1 opposite to the brackets 33 on the side of the protruded frame. A compression spring 29 as a shock absorber is interposed between both brackets 33 and 32 using a long bolt 30 and a nut 31.

A rail 34 extending in the axial direction is disposed on the periphery of the external cylinder 1. A rail guide 35 for guiding the rail 34 is disposed on the protruded frame 36. Movement in the upward or down direction on the external cylinder 1 is guided by the rail 34 and the rail guide 35 and reaction force to rotation by the motor 9 and the motor 10 for driving the excavating blade is supported by the rail 34 and the rail guide 35. Both rail 34 and rail guide 35 constitute a guide system.

The frame 36 is provided with a limit switch fitting bracket 38 and a limit switch 37 as a detector is fitted to the bracket. That is, the limit switch 37 is mounted at the position allowing detection of ascending and descending of the feeder system. A striker 39 for striking the limit switch 37 is mounted on the external cylinder 1. A reference numeral 45 designates a belts joining roller for joining the descending belt 20 and the ascending belt 21 by narrowing space between them.

Next, operation of this belt unloader will be described. Bulk P is scraped upward by turning the screw shaft 3 and the excavating blade 6 in the reverse direction each other and is supplied between the descending belt 20 and the ascending belt 21 of the belt conveyor through the bulk loading orifice 23. As described above, bulk P is unloaded with it held between the descending belt 20 and the ascending belt 21.

In unloading operation, it is estimated that a ship may fluctuate due to waves and the bottom of the ship may collide against the lower end of the screw shaft 3 in the screw feeder system F or against the lower face of the excavating blade 6. In such a case, shock is absorbed because the compression spring 29 is stretched at one and the whole screw feeder system F is lifted. When it is estimated that too much load to be absorbed by the completion spring 29 may be applied, the striker 39 is lifted to strike the limit switch 37. As a result, the limit switch 37 generates a signal indicating the detection. A control unit not shown operates a boom hoisting cylinder 54 in response to the signal and lifts a boom 40 promptly. Therefore, the bottom of a ship and/or the screw feeder system F are/is not damaged.

Figure 13A:
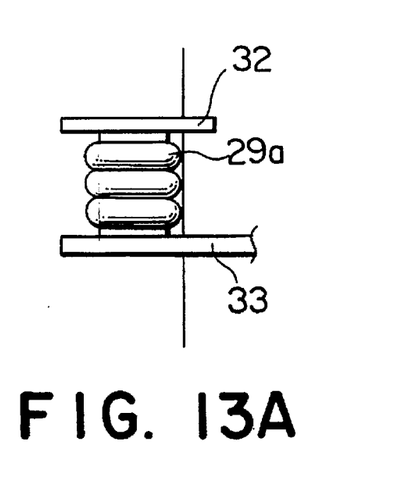
FIGS. 13A to 13D are views for use in describing various examples of a shock absorber comprised in the belt unloader shown in FIG. 9.
Figure 13B:
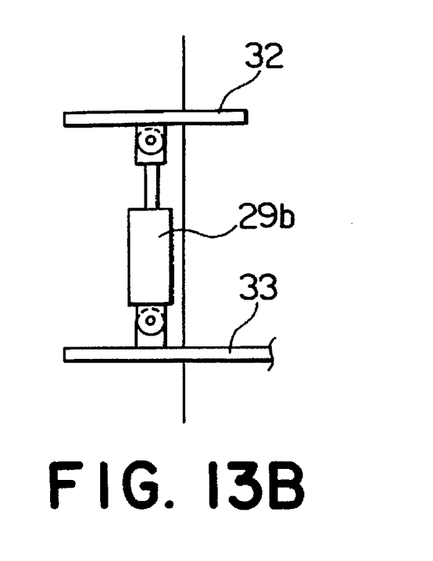
Figure 13C:
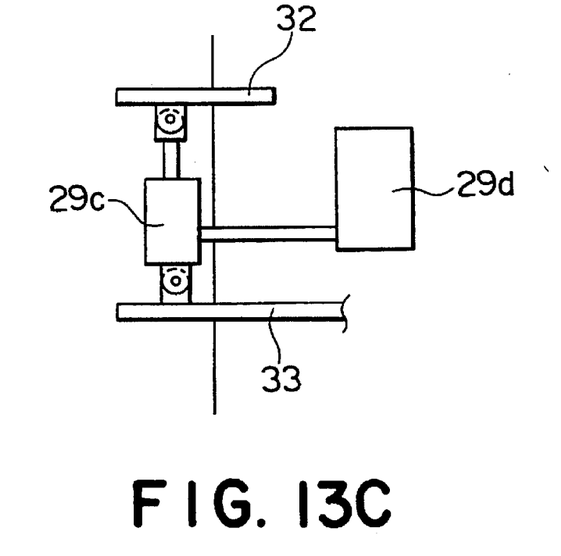
Figure 13D:
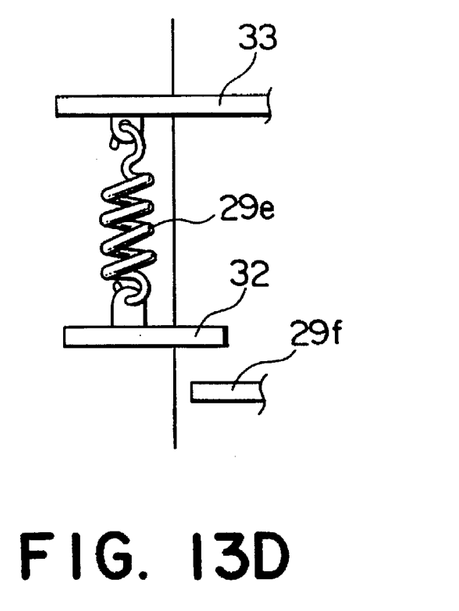

Various elements may be used as a shock absorber other than the compression spring 39. For example, in FIG. 13A, an air spring 29a is interposed between the bracket 33 on the side of the protruded frame and the bracket 32 on the side of the external cylinder. In FIG. 13B, a shock absorber 29b is interposed between the bracket 33 on the side of the protruded frame and the bracket 32 on the side of the external cylinder. In FIG. 13C, a cylinder system 29c is interposed between the bracket 33 on the side of the protruded frame and the bracket 32 on the side of the external cylinder and an accumulator 29d is joined to the cylinder system 29c. For a special example, in FIG. 13D, a tension spring 29e is interposed between the bracket 33 on the side of the protruded frame and the bracket 32 on the side of the external cylinder and a drop preventing stopper 29f is provided under the bracket 32 on the side of the external cylinder.

Figure 14A:
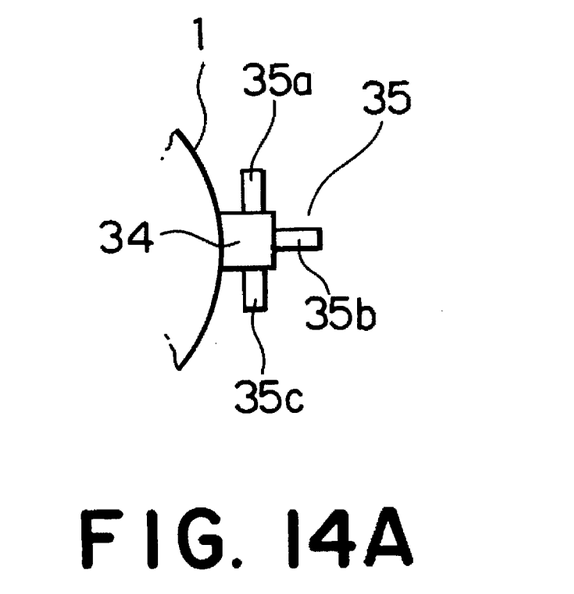
FIGS. 14A to 14B are views for use in describing different examples of a guide member comprised in the belt unloader shown in FIG. 9.
Figure 14B:
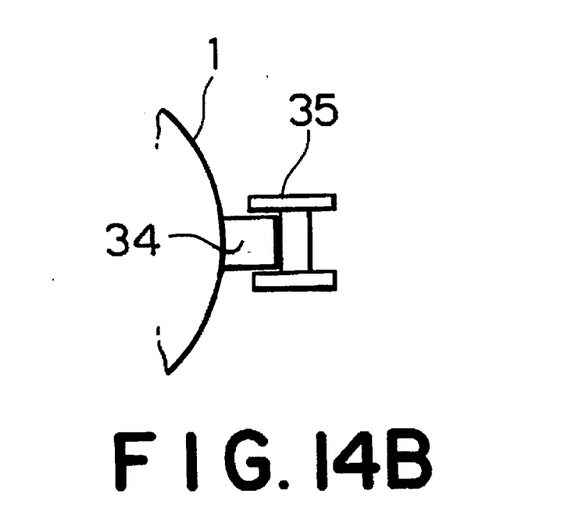

Rollers 35a, 35b and 35c guiding the rail 34 from three directions may be used instead of the rail guide 35 of the guide system as shown in FIG. 14A and a flanged roller to be engaged with the rail 34 may be used as shown in FIG. 14B.

As the above-described screw feeder system is provided with the releasing plate 13 at the upper end of the screw propeller 2, even bulk cargo with low fluidity can be securely carried into the bulk loading orifice 23. Further, as no bearing is disposed on the lower face of the screw shaft 3 and the lower face of the excavating blade 6 is also open, little bulk is left on the bottom of a ship. The short list of a screw reduces required power to change the conventional screw feeder system to an energy saving type. Further, as the above-described screw feeder system is lightweight and compact, it can be easily built in the belt unloader and a belt unloader producing little noise can be provided.

As the screw feeder system is supported by the shock absorber, the weight of the whole screw feeder system is applied to the shock absorber and the screw feeder system can be lifted by small power from downward. Therefore, as the screw feeder system can be lifted promptly even if it collides against the bottom of a ship rapidly, neither of the bottom of the ship and the screw feeder system are damaged. Further, as the screw feeder system uses the shock absorber, reaction force of a spring is reduced as the system is lifted and no force to operate the screw feeder system by small power is applied for good. Therefore, the screw feeder system can continue normal bulk scraping operation without stopping the operation. Further, if it is estimated that excessive thrust force exceeding the limit of shock absorption by the shock absorber may be applied to the screw feeder system from the bottom of a ship, neither of the bottom of a ship and the screw feeder system are damaged because the boom is lifted by operating the limit switch.

While the present invention has thus far been described in connection with a few embodiments thereof, it will readily be possible for those skilled in the art to put this invention into practice in various other manners. For example, a noncontact-type position detector may be used as a limit switch. A well-known bridge-type belt may be used instead of a twin belt conveying means.

What is claimed is:

1. A belt unloader for carrying bulk cargo, said belt unloader comprising a movable boom and a vertical carrier connected to said boom such that said carrier can swing, wherein said vertical carrier comprises:

a body frame suspended from said boom;
   a supporting frame pivotally mounted to said body frame;
   a driving unit arranged between said supporting frame and said body frame for tilting said supporting frame;
   a screw feeder system supported by said supporting frame; and a conveyor, including two belts extending along said body frame and said supporting frame, for vertically carrying bulk cargo from a bulk cargo loading orifice of said screw feeder system;

said screw feeder system further comprising:

a rotatable screw shaft extending in a vertical direction and having an upper part supported through a plurality of bearings;

a bulk cargo releasing plate disposed on said screw shaft below said plurality of bearings, said bulk cargo loading orifice being formed at a side of said releasing plate;

a screw propeller disposed on said screw shaft below said releasing plate; and an external cylinder having an open lower end and surrounding said releasing plate and said screw propeller.

2. A belt unloader as claimed in claim 1, wherein said screw feeder system further comprises:

an excavating drum rotatably supported on a lower part of said external cylinder, said excavating drum including an excavating blade having an open lower end.

3. A belt unloader as claimed in claim 1, further comprising:

a guide system for guiding said screw feeder system such that said screw feeder system is movable in the vertical direction relative to said supporting frame; and a shock absorber for absorbing shock when said screw feeder system is moved in the vertical direction.

4. A belt unloader as claimed in claim 3, wherein said screw feeder system further comprises:

an excavating drum rotatably supported on a lower part of said external cylinder, said excavating drum including an excavating blade having an open lower end.

5. A belt unloader as claimed in claim 3, wherein said shock absorber further comprises:

a spring interposed between said screw feeder system and said supporting frame.

6. A belt unloader as claimed in claim 3, further comprising:

a detector for detecting a lifting of said screw feeder system at a predetermined position to produce a detection signal; and a boom driving unit connected to said detector for hoisting said boom in response to said detection signal.

\* \* \* \* \*